United States Patent
Zhao

(10) Patent No.: US 10,904,936 B1
(45) Date of Patent: Jan. 26, 2021

(54) WIRELESS COMMUNICATION SERVICE DELIVERY OVER A FIFTH GENERATION NEW RADIO (5GNR) ACCESS NODE AND A LONG TERM EVOLUTION (LTE) ACCESS NODE

(71) Applicant: Sprint Communications Company L.P., Overland Park, KS (US)

(72) Inventor: Young Zhao, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/433,787

(22) Filed: Jun. 6, 2019

(51) Int. Cl.
*H04W 72/04* (2009.01)
*H04W 76/15* (2018.01)
*H04W 36/14* (2009.01)
*H04L 5/00* (2006.01)
*H04W 36/22* (2009.01)

(52) U.S. Cl.
CPC .......... *H04W 76/15* (2018.02); *H04L 5/0042* (2013.01); *H04L 5/0046* (2013.01); *H04L 5/0098* (2013.01); *H04W 36/14* (2013.01); *H04W 36/22* (2013.01); *H04W 72/0486* (2013.01)

(58) Field of Classification Search
None
See application file for complete search history.

(56) References Cited

U.S. PATENT DOCUMENTS

| 8,446,872 B2 | 5/2013 | Choi et al. | |
|---|---|---|---|
| 2015/0109927 A1* | 4/2015 | Ozturk | H04W 40/20 370/235 |
| 2015/0134769 A1* | 5/2015 | Cao | H04L 47/30 709/213 |
| 2015/0289279 A1* | 10/2015 | Xu | H04W 72/0486 370/329 |
| 2015/0341941 A1* | 11/2015 | Nguyen | H04W 72/082 370/332 |
| 2016/0088510 A1* | 3/2016 | Berggren | H04W 36/0083 370/230 |
| 2017/0064602 A1* | 3/2017 | Kotecha | H04L 12/189 |
| 2017/0303288 A1* | 10/2017 | Li | H04B 17/309 |
| 2018/0007583 A1 | 1/2018 | Hong et al. | |
| 2018/0124642 A1* | 5/2018 | Phuyal | H04W 24/10 |
| 2018/0206282 A1* | 7/2018 | Singh | H04W 88/06 |

(Continued)

FOREIGN PATENT DOCUMENTS

| WO | 2017126945 A1 | 7/2017 |
|---|---|---|
| WO | 2018219096 A1 | 12/2018 |

(Continued)

*Primary Examiner* — Ajit Patel

(57) ABSTRACT

A wireless communication network serves User Equipment (UE) over a Fifth Generation New Radio (5GNR) access node and a Long Term Evolution (LTE) access node. The LTE access node determines a utilization metric for the LTE access node and selects 5GNR/LTE allocations based on the utilization metric for the LTE access node. The LTE access node receives user data for the UE and transfers a portion of the user data to the 5GNR access node per the 5GNR/LTE allocations. The LTE access node transfers the remainder of the user data to the UE over an LTE link per the 5GNR/LTE allocations. The 5GNR access node receives the portion of the user data and transfers the portion of the user data to the UE over a 5GNR link per the 5GNR/LTE allocations.

20 Claims, 13 Drawing Sheets

(56) References Cited

U.S. PATENT DOCUMENTS

2018/0279192 A1\* 9/2018 Raissinia .............. H04W 36/38
2018/0368199 A1   12/2018 Zeng et al.
2019/0069325 A1   2/2019 Yerramalli et al.

FOREIGN PATENT DOCUMENTS

WO   2018226065 A1   12/2018
WO   2017195854 A1   3/2019

\* cited by examiner

US 10,904,936 B1

WIRELESS COMMUNICATION SERVICE DELIVERY OVER A FIFTH GENERATION NEW RADIO (5GNR) ACCESS NODE AND A LONG TERM EVOLUTION (LTE) ACCESS NODE

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless signals transport user data and network signaling. The wireless access nodes exchange the user data and network signaling with other network elements to help deliver the wireless data services. Exemplary wireless communication networks include Fifth Generation New Radio (5GNR) networks and Long Term Evolution (LTE) networks.

Some wireless user devices have both LTE radios and 5GNR radios. These dual 5GNR/LTE user devices can wirelessly communicate with both 5GNR access nodes and LTE access nodes at the same time. Thus, hybrid 5GNR/LTE networks transfer user data to 5GNR/LTE user devices over dual 5GNR/LTE links using both 5GNR access nodes and LTE access nodes. The allocation of the user data between the 5GNR access node and the LTE access node remains fairly simple and rigid. Unfortunately, 5GNR/LTE communication networks do not efficiently and effectively transfer user data to 5GNR/LTE user devices over dual 5GNR/LTE links. Moreover, the 5GNR/LTE access nodes do not interact with one another to intelligently transfer user data to the 5GNR/LTE user devices.

TECHNICAL OVERVIEW

A wireless communication network serves User Equipment (UE) over a Fifth Generation New Radio (5GNR) access node and a Long Term Evolution (LTE) access node. The LTE access node determines a utilization metric for the LTE access node and selects 5GNR/LTE allocations based on the utilization metric for the LTE access node. The LTE access node receives user data for the UE and transfers a portion of the user data to the 5GNR access node per the 5GNR/LTE allocations. The LTE access node transfers the remainder of the user data to the UE over an LTE link per the 5GNR/LTE allocations. The 5GNR access node receives the portion of the user data and transfers the portion of the user data to the UE over a 5GNR link per the 5GNR/LTE allocations.

DETAILED DESCRIPTION

Figure 1:
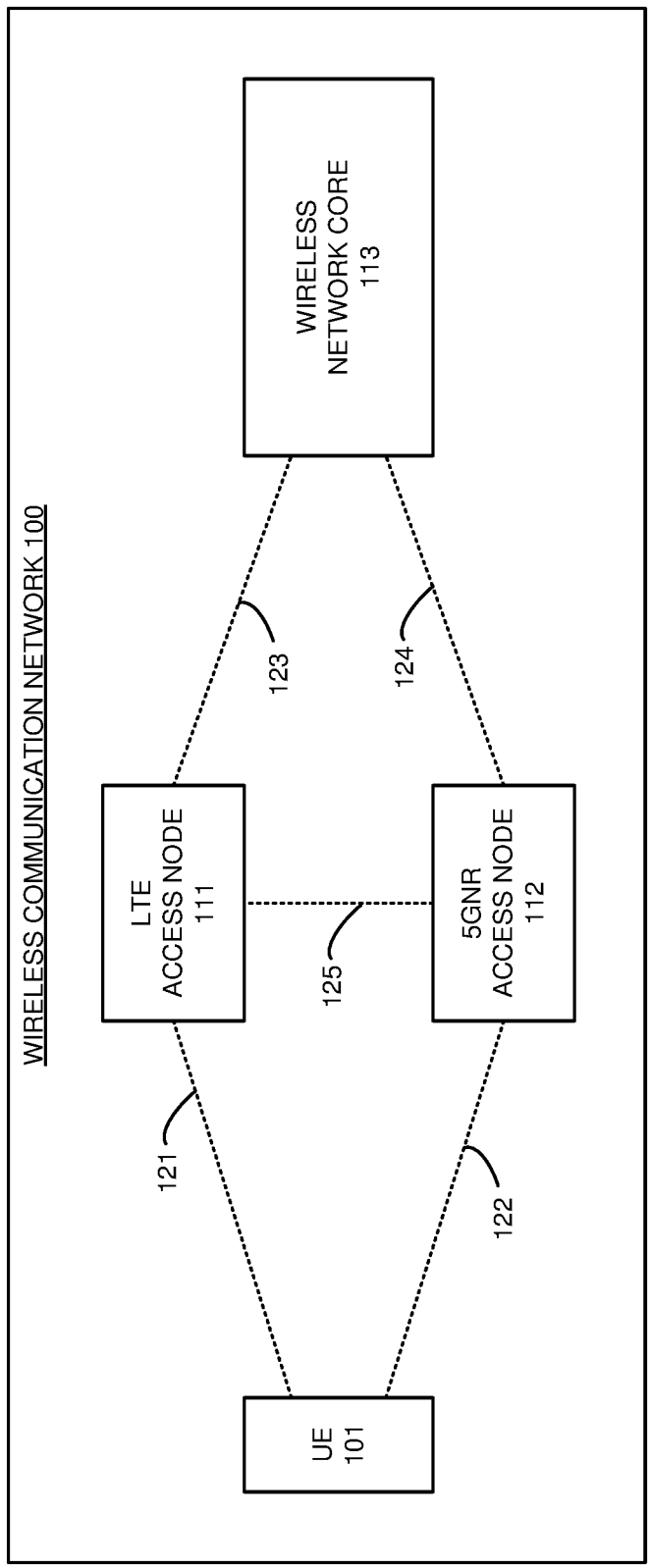
FIG. 1 illustrates a wireless communication network to serve User Equipment (UE) over a Long Term Evolution (LTE) access node and a Fifth Generation New Radio (5GNR) access node.

FIG. 1 illustrates wireless communication network 100 to serve User Equipment (UE) 101 over Long Term Evolution (LTE) access node 111 and Fifth Generation New Radio (5GNR) access node 112. Wireless communication network 100 serves UE 101 with data services like media-conferencing, social-networking, media-streaming, machine communications, and internet access. Wireless communication network 100 comprises UE 101, LTE access node 111, 5GNR access node 112, and wireless network core 113. UE 101 is coupled to LTE access node 111 over LTE link 121. UE 101 is coupled to 5GNR access node 112 over 5GNR link 122. Wireless network core 113 is coupled to LTE access node 111 over LTE links 123. Wireless network core 113 is coupled to 5GNR access node 112 over 5GNR links 124. LTE access node 111 and 5GNR access node 112 are coupled over X2 links 125.

UE 101 might be a phone, computer, robot, vehicle, sensor, or some other apparatus with communication circuitry. Wireless network core 113 comprises network elements that might include Access and Mobility Management Function (AMF), User Plane Function (UPF), Mobility Management Entity (MME), Serving Gateway (SGW), and/or the like. FIG. 1 has been simplified for clarity and there are typically many more UEs and access nodes than the amount shown.

Access nodes 111-112 each comprise transceiver circuitry and processing circuitry. The transceiver circuitry comprises antennas, modulators, amplifiers, filters, digital/analog interfaces, microprocessors, memory, and bus connections. The processing circuitry comprises microprocessors, memory, user interfaces, and bus connections. In access nodes 111-112, the microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disc drives, and/or the like. The memories store operating systems and network applications. The microprocessors execute the operating systems and network applications to wirelessly exchange user data with UE 101 over links 121-122 and to exchange the user data with network core 113 over links 123-124. Exemplary network applications comprise Physical Layer (PHY), Media Access Control (MAC), Radio Link Control (RLC), Packet Data Convergence Protocol (PDCP), Radio Resource Control (RRC), Service Data Adaptation Protocol (SDAP), and Common Public Radio Interface (CPRI).

LTE access node 111 determines a utilization metric that indicates how much of its communication resources are being consumed by UEs—including UE 101. The utilization metric could be the average percent of LTE resource blocks that are being used on the downlink and/or the uplink. LTE access node 111 selects 5GNR/LTE allocations based on the utilization metric. For example, LTE access node 111 may enter a data structure with the average percent of resource block utilization to yield a percent of 5GNR data allocation and a percent of LTE data allocation that would typically add up to 100 percent.

In some examples, LTE access node 111 receives user data for UE 101 from wireless network core 113 over LTE links 123. LTE access node 111 transfers a portion of the user data to 5GNR access node 112 over X2 links 125 per the 5GNR/LTE allocations. LTE access node 111 transfers the remainder of the user data to UE 101 over LTE link 121 per the 5GNR/LTE allocations. 5GNR access node 112 receives its portion of the user data from LTE access node 111 over X2 links 125. 5GNR access node 112 transfers this portion of the user data to UE 101 over 5GNR links 122 per the 5GNR/LTE allocations.

In some examples, LTE access node 111 transfers 5GNR/LTE allocations to 5GNR access node 112 over X2 links 125. 5GNR access node 112 then receives user data for UE 101 from wireless network core 113 over 5GNR links 124. 5GNR access node 112 transfers a portion of the user data to LTE access node 111 over X2 links 125 per the 5GNR/LTE allocations. 5GNR access node 112 transfers the remainder of the user data to UE 101 over 5GNR link 122 per the 5GNR/LTE allocations. LTE access node 111 receives its portion of the user data from 5GNR access node 112 over X2 links 125. LTE access node 111 transfers this portion of the user data to UE 101 over LTE link 121 per the 5GNR/LTE allocations.

Figure 2:
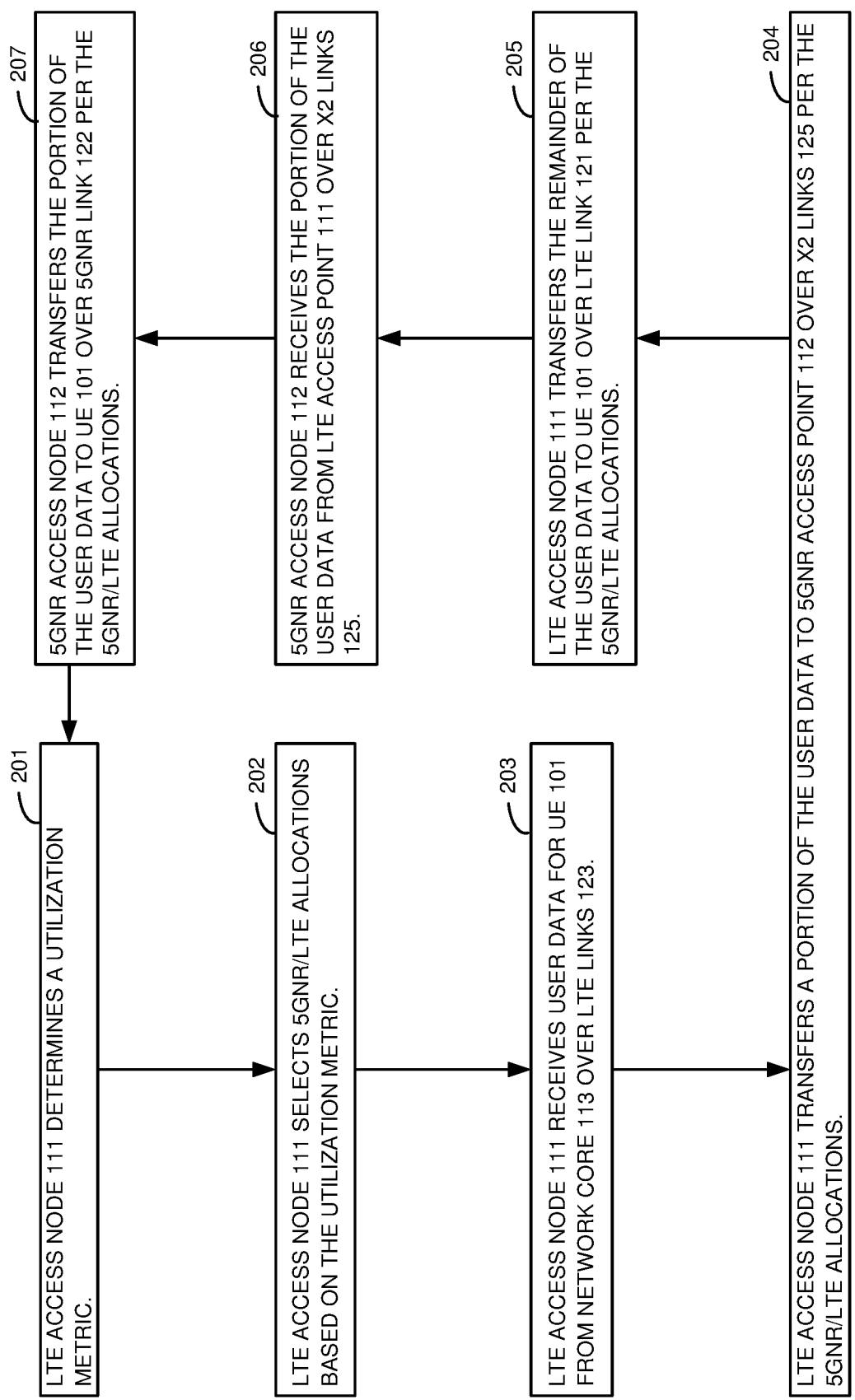
FIG. 2 illustrates the operation of the wireless communication network to serve the UE over the LTE access node and the 5GNR access node.

FIG. 2 illustrates the operation of wireless communication network 100 to serve UE 101 over LTE access node 111 and 5GNR access node 112. LTE access node 111 determines a utilization metric (201). The utilization metric could be the average percent of LTE resource blocks that are being used by all UEs served by LTE access node 111. LTE access node 111 selects 5GNR/LTE allocations based on the utilization metric (202). For example, LTE access node 111 may enter a data structure with the access node utilization to yield a 5GNR allocation percent and an LTE allocation percent. LTE access node 111 receives user data for UE 101 from wireless network core 113 over LTE links 123 (203). LTE access node 111 transfers a portion of the user data to 5GNR access node 112 over X2 links 125 per the 5GNR/LTE allocations (204). LTE access node 111 transfers the remainder of the user data to UE 101 over LTE link 121 per the 5GNR/LTE allocations (205). 5GNR access node 112 receives the portion of the user data from LTE access node 111 over X2 links 125 (206). 5GNR access node 112 transfers the portion of the user data to UE 101 over 5GNR link 122 per the 5GNR/LTE allocations (207). The operation repeats (201). The operation (201-207) may be repeated on a periodic basis like every minute.

Figure 3:
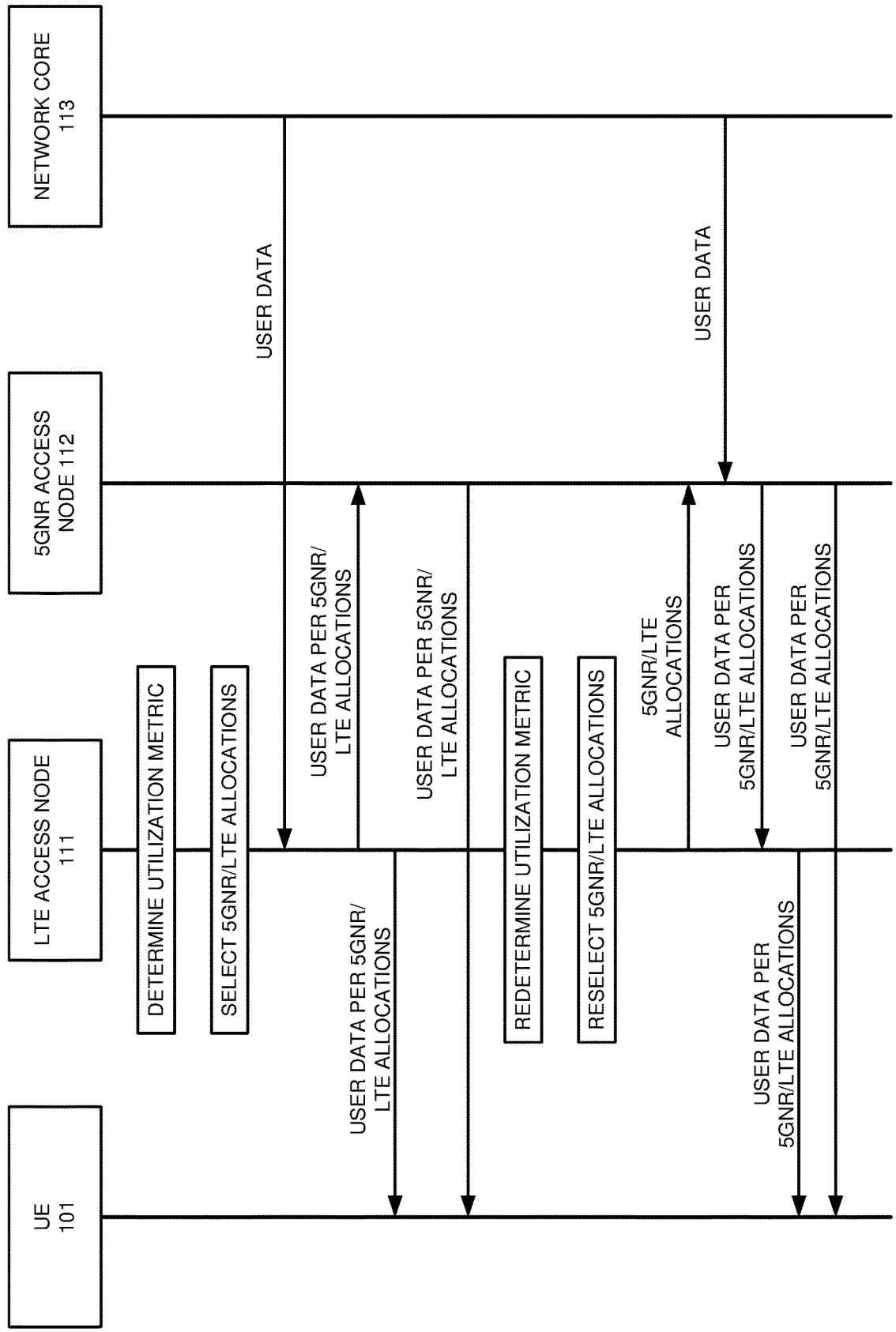
FIG. 3 illustrates the operation of the wireless communication network to serve the UE over the LTE access node and the 5GNR access node.

FIG. 3 illustrates the operation of wireless communication network 100 to serve UE 101 over LTE access node 111 and 5GNR access node 112. LTE access node 111 determines a utilization metric that indicates how much of its communication resources are being consumed. LTE access node 111 selects 5GNR/LTE allocations based on the utilization metric. LTE access node 111 receives user data for UE 101 from wireless network core 113. LTE access node 111 transfers some of the user data to 5GNR access node 112 per the 5GNR/LTE allocations. LTE access node 111 transfers the remainder of the user data to UE 101 per the 5GNR/LTE allocations. 5GNR access node 112 receives the portion of the user data from LTE access node 111. 5GNR access node 112 transfers the portion of the user data to UE 101 per the 5GNR/LTE allocations.

Subsequently, LTE access node 111 re-determines the utilization metric. LTE access node 111 reselects the 5GNR/LTE allocations based on the new utilization metric. LTE access node 111 transfers the new 5GNR/LTE allocations to 5GNR access node 112. 5GNR access node 112 receives additional user data for UE 101 from network core 113. 5GNR access node 112 transfers some of the user data to LTE access node 111 per the 5GNR/LTE allocations. 5GNR access node 112 transfers the remainder of the user data to UE 101 per the 5GNR/LTE allocations. LTE access node 111 receives its allocation of the user data from 5GNR access node 112. LTE access node 111 transfers its allocation of the user data to UE 101.

Figure 4:
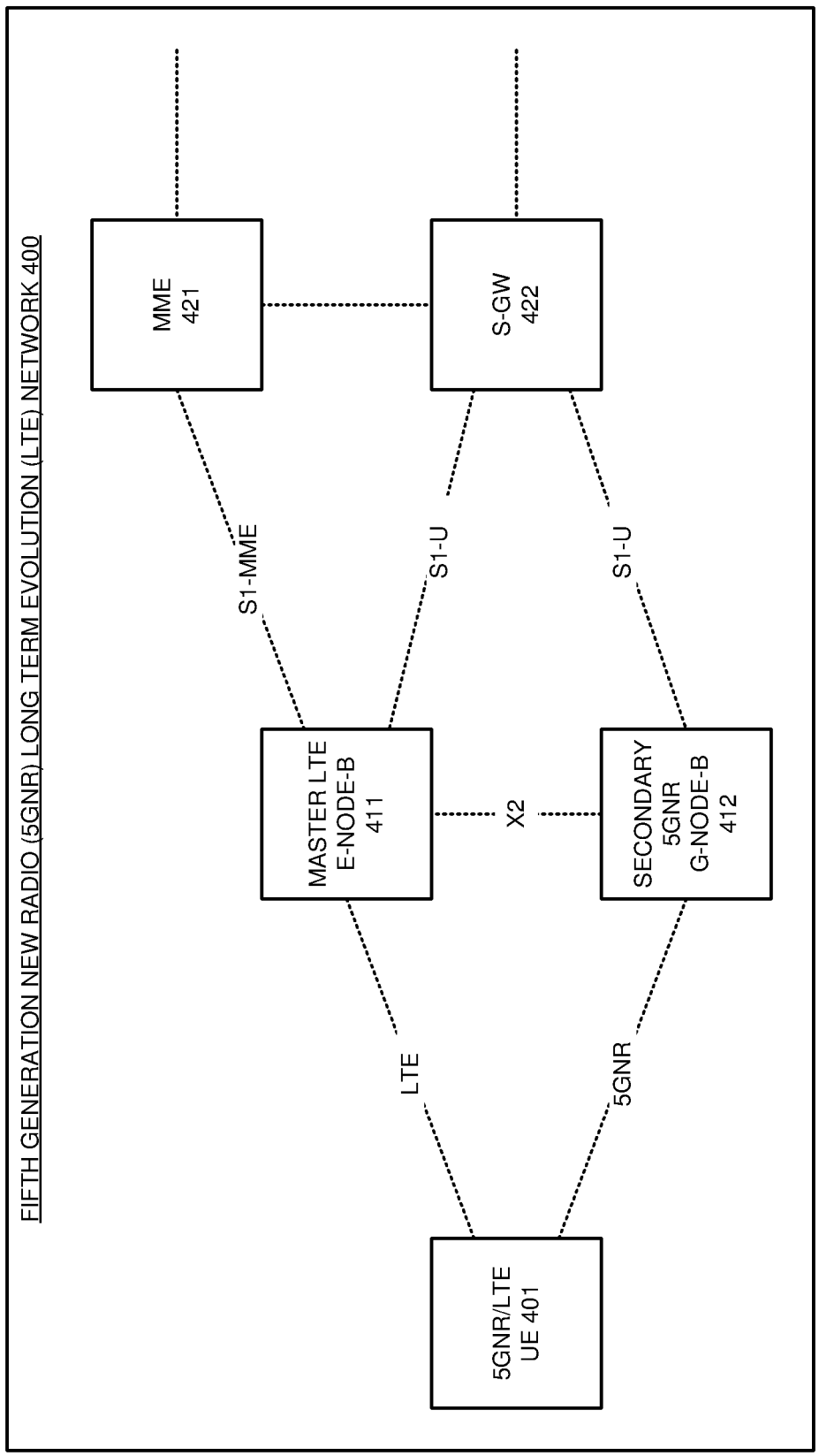
FIG. 4 illustrates a 5GNR/LTE network to serve a 5GNR/LTE UE over a master LTE eNodeB and a secondary 5GNR gNodeB.

FIG. 4 illustrates 5GNR/LTE network 400 to serve 5GNR/LTE UE 401 over master LTE eNodeB 411 and secondary 5GNR gNodeB 412. 5GNR/LTE network 400 is an example of wireless communication network 100, although network 100 may differ. 5GNR/LTE network 400 comprises UE 401, master eNodeB 411, secondary gNodeB 412, Mobility Management Entity (MME) 421, and Serving Gateway (S-GW) 422. UE 401 is coupled to master LTE eNodeB 411 over an LTE link. UE 401 is coupled to secondary 5GNR gNodeB 412 over a 5GNR link. Master LTE eNodeB 411 and secondary 5GNR gNodeB 412 are coupled by X2-User (U) and X2-Control (C) links. Master LTE eNodeB 411 and MME 421 are coupled over S1-MME links. Master LTE eNodeB 411 and S-GW 422 are coupled over S1-U links. In some examples, secondary 5GNR gNodeB 412 and S-GW 422 are also coupled over S1-U links. MME 421 and S-GW 422 are couple to one another and to other network elements which are omitted for clarity.

In this example, master LTE eNodeB 411 determines its downlink resource block utilization. The downlink resource block utilization indicates the amount of downlink resource blocks that serve UEs versus the amount of unused downlink resource blocks. Master LTE eNodeB 411 selects 5GNR/LTE allocations based on the downlink resource block utilization. Master LTE eNodeB 411 receives user data for UE 401 from S-GW 422 over the S1-U link. Master LTE eNodeB 411 transfers a portion of the user data to secondary 5GNR gNodeB 412 over an X2-U link per the 5GNR/LTE allocations. Master LTE eNodeB 411 transfers the rest of the user data to UE 401 over the LTE link per the 5GNR/LTE allocations. Secondary 5GNR gNodeB 412 receives the portion of the user data from master LTE eNodeB 411. Secondary 5GNR gNodeB 412 transfers the portion of the user data to UE 401 over a 5GNR link.

Master LTE eNodeB 411 may transfer the 5GNR/LTE allocations to secondary 5GNR gNodeB 412 over an X2-C link. Secondary 5GNR gNodeB 412 then receives user data for UE 401 from S-GW 422 over an S1-U link. Secondary 5GNR gNodeB 412 transfers a portion of the user data to master LTE eNodeB 411 over an X2-U link per the 5GNR/LTE allocations. Secondary 5GNR gNodeB 412 transfers the remainder of the user data to UE 401 over the 5GNR link per the 5GNR/LTE allocations. Master LTE eNodeB 411 receives the portion of the user data from secondary 5GNR gNodeB 412 over the X2-U link. Master LTE eNodeB 411 transfers the portion of the user data to UE 401 per the 5GNR/LTE allocations.

Figure 5:
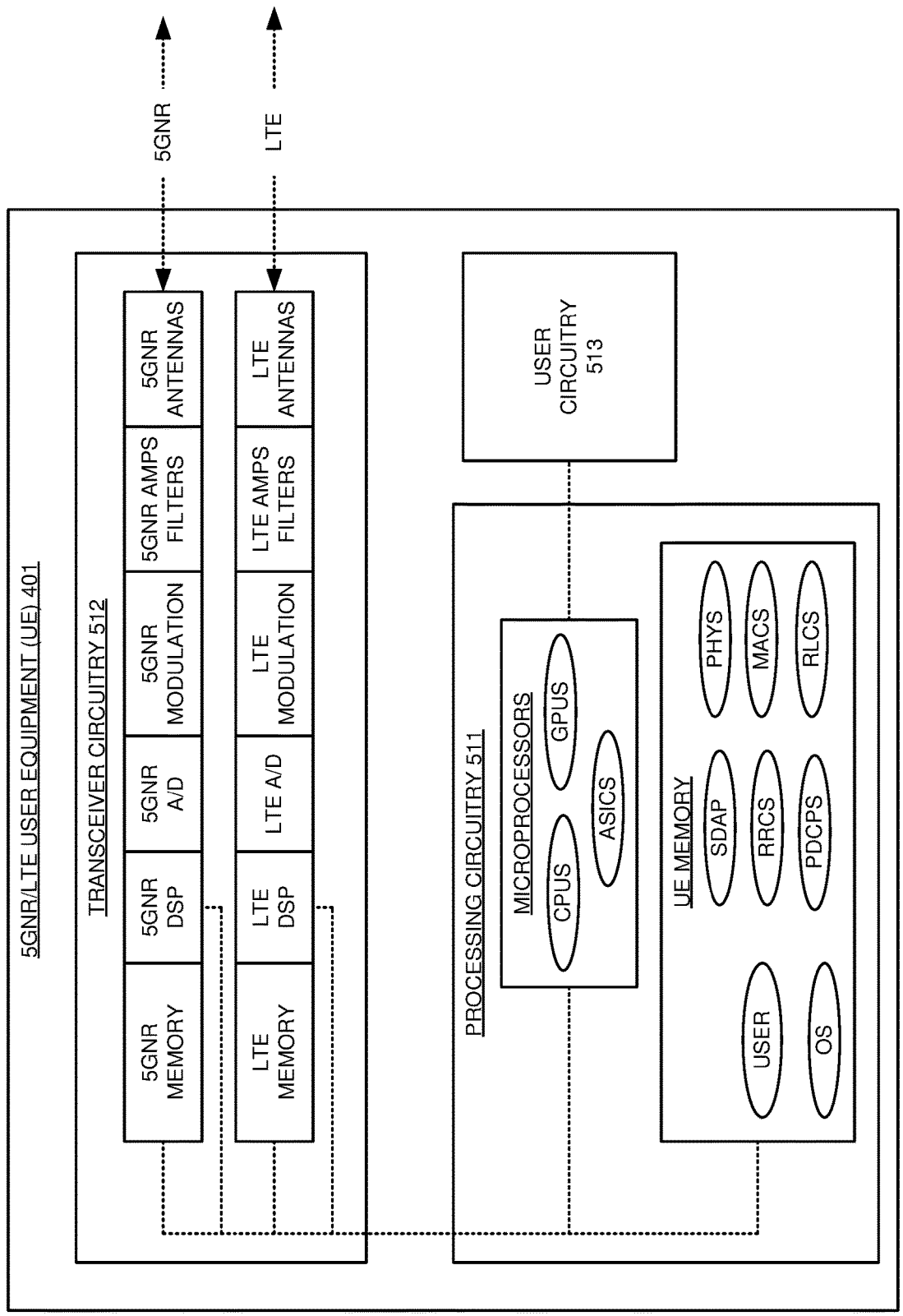
FIG. 5 illustrates the 5GNR/LTE UE that is served by the master LTE eNodeB and the secondary 5GNR gNodeB.

FIG. 5 illustrates 5GNR/LTE UE 401 that is served by master LTE eNodeB 411 and secondary 5GNR gNodeB 412. 5GNR/LTE UE 401 is an example of UE 101 although UE 101 may differ. 5GNR/LTE UE 401 comprises processing circuitry 511, transceiver circuitry 512, and user circuitry 513 which are interconnected over bus circuitry. User circuitry 513 comprises graphic displays, machine controllers, sensors, cameras, transceivers, and/or some other user interface components. Transceiver circuitry 512 comprises radios for 5GNR and LTE. The radios each comprise antennas, amplifiers (AMPS), filters, modulation, analog/digital interfaces (A/D), Digital Signal Processors (DSP), and memory. The radios may share some of these components by using time diversity, frequency separation, and the like.

Processing circuitry 511 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system (OS), user applications, and network applications for 5GNR and LTE. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). The microprocessors execute the operating system, user applications, and network applications to exchange user data and network signaling with wireless access nodes over the 5GNR link and the LTE link.

The user applications store Uplink (UL) user data and signaling in the UE memory. The LTE network applications process the UL user data/signaling and Downlink (DL) network signaling to generate UL network signaling. The LTE network applications transfer the UL user data and network signaling to the LTE memory in transceiver circuitry 512. In transceiver circuitry 512, the DSP processes the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless LTE signals that transport the UL user data and network signaling to master LTE eNodeB 411.

In the transceiver circuitry 512, the LTE antennas receive wireless LTE signals that transport user data and network signaling from master eNodeB 411. The 5GNR antennas receive wireless 5GNR signals that transport user data from secondary gNodeB 412. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL user data and network signaling. The microprocessors execute the network applications to store the DL user data and signaling in the UE memory. The user applications process their user data and signaling in the UE memory.

Figure 6:
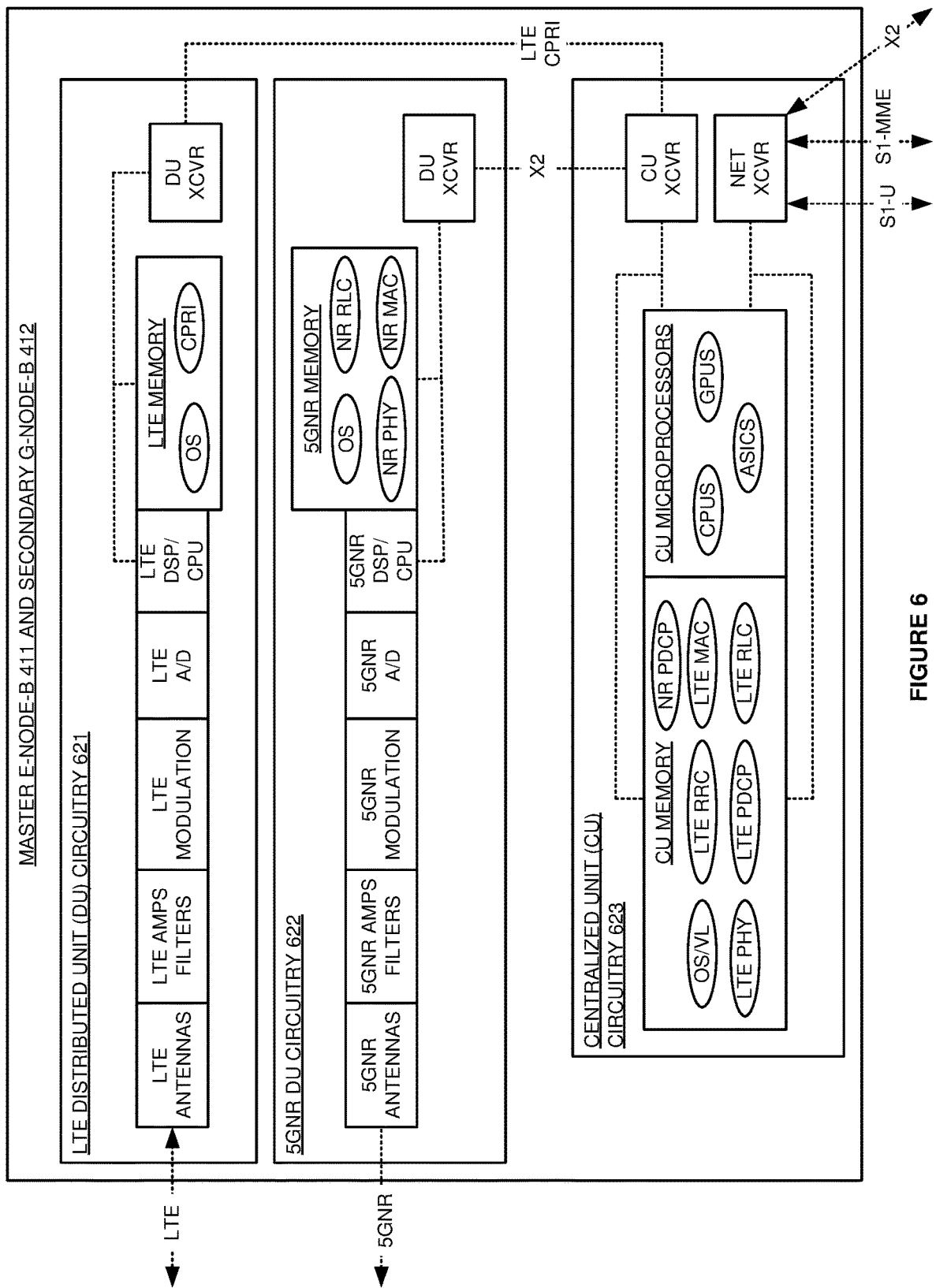
FIG. 6 illustrates the master LTE eNodeB and the secondary 5GNR gNodeB that serve the 5GNR/LTE UE.

FIG. 6 illustrates master LTE eNodeB 411 and secondary 5GNR gNodeB 412 that serve 5GNR/LTE UE 401. Node-Bs 411-412 comprise an example of access nodes 111-112, although nodes 111-112 may differ. Master LTE eNodeB 411 comprises LTE Distributed Unit (DU) circuitry 621 and Centralized Unit (CU) circuitry 623. Secondary 5GNR gNodeB 412 comprises 5GNR DU circuitry 622, and in some examples, a portion of CU circuitry 623. DU circuitry 621-622 each comprise antennas, amplifiers/filters, modulation, A/D, DSP/CPU, memory, and DU transceivers (XCVR) that are coupled over bus circuitry. CU circuitry 623 comprises CU microprocessors, CU memory, CU transceivers, and network transceivers that are coupled over bus circuitry.

The antennas in LTE DU circuitry 621 are coupled to 5GNR/LTE UE 401 over a wireless LTE link. The antennas in 5GNR circuitry 622 are coupled to the 5GNR/LTE UE 401 over a wireless 5GNR link. The DU transceivers in LTE DU circuitry 621 are coupled to the CU transceivers in CU circuitry 623 over LTE Common Public Radio Interface (CPRI) links. The DU transceivers in 5GNR DU circuitry 622 are coupled to the CU transceivers in CU circuitry 623 over X2 links. The network transceivers in CU circuitry 623 are coupled to MMEs over S1-MME links. The network transceivers in CU circuitry 623 are coupled to S-GWs over S1-U links. The network transceivers in CU circuitry 623 are coupled to other NodeBs over X2 links.

In LTE DU circuitry 621, the LTE memory stores an operating system and network applications for CPRI. In 5GNR DU circuitry 622, the 5GNR memory stores an operating system and network applications for 5GNR PHY, MAC, and RLC. In CU circuitry 623, the CU memory stores an operating system, virtual layer (VL) components, and network applications. The virtual layer components comprise hypervisor modules, virtual switches, virtual machines, and/or the like. The network applications include LTE PHY, LTE MAC, LTE RLC, LTE PDCP, LTE RRC, and NR PDCP. In this example, 5GNR DU circuitry 622 hosts the network applications for NR PHY, NR MAC, and NR RLC while CU circuitry 623 hosts the network applications for NR PDCP, LTE PHY, LTE MAC, LTE RLC, LTE PDCP, and LTE RRC. In other examples, circuitry 621-623 may use other network application splits.

In DU circuitry 621, the antennas receive wireless LTE signals from 5GNR/LTE UEs that transport UL user data and network signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSPs recover UL LTE symbols from the UL digital signals. In LTE CU circuitry 621, the LTE DSP/CPU executes the LTE CPRI to format the UL LTE symbols for transmission. The DU transceivers transfer the UL LTE symbols to the CU transceivers in CU circuitry 623 over the CPRI links.

In CU circuitry 623, the CU microprocessors execute the LTE PHY, LTE MAC, LTE RLC, LTE PDCP, and LTE RRC to recover UL RRC data and RRC signaling from the UL LTE symbols. The CU microprocessors execute the LTE RRC to process UL RRC data, UL RRC signaling, DL S1-U data and DL S1-MME signaling to generate DL RRC data, DL RRC signaling, UL S1-U data and UL S1-MME signaling. The network transceivers transfer the UL S1-U data to LTE-SGW 422 over the S1-U links. The network transceivers transfer the UL S1-MME signaling to MME 421 over the S1-MME links.

The network transceivers receive DL S1-MME signaling from MME 421 over the S1-MME links. The network transceivers receive DL S1-U data from S-GW 422 over the S1-U links. The CU microprocessors execute the LTE RRC to process the UL RRC signaling and DL S1-MME signaling to generate DL RRC signaling and UL S1-MME signaling. The CU microprocessors execute the LTE RRC data to process the DL S1-U data to generate DL 5GNR PDUs and DL LTE symbols. The CU transceivers transfer the DL LTE symbols to LTE DU circuitry 621 over the CPRI link. The CU transceivers transfer the DL 5GNR PDUs to 5GNR DU circuitry 622 over the X2 link.

In LTE DU circuitry 621, the LTE CPU executes the LTE DSP to process the DL LTE symbols and generate corresponding digital DL signals for the LTE A/D. In 5GNR DU circuitry 622, the 5GNR CPU executes the 5GNR RLC, MAC, and PHY to process the DL PDUs to generate DL 5GNR symbols. The 5GNR DSP processes the DL 5GNR symbols to generate corresponding digital DL signals for the 5GNR A/D. In DU circuitry 621-622, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless LTE and 5GNR signals that transport the DL data and signaling to 5GNR/LTE UE 401.

In CU circuitry 623, the 5GNR SDAP maps between the user data and Service Data Units (SDUs). The 5GNR RRC maps between network signaling and SDUs. The LTE RRC maps between user data/network signaling and SDUs. The 5GNR SDAP and the LTE/5GNR RRCs exchange their SDUs with the LTE/5GNR PDCPs. The PDCPs map between the SDUs and Protocol Data Units (PDUs). The 5GNR/LTE PDCPs exchange the PDUs with the LTE RLC in circuitry 623 and with the 5GNR RLC in DU circuitry 622.

The RLCs map between the PDUs and MAC logical channels. The RLCs exchange the user data and network signaling with the MACs over the MAC logical channels. The MACs map between the MAC logical channels and MAC transport channels. The MAC exchanges the user data and network signaling with the PHYs over the MAC transport channels. The PHYs map between the MAC transport channels and PHY transport channels. The PHYs exchange the user data and network signaling with PHYs in 5GNR/LTE UE 401 over the PHY transport channels.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 7:
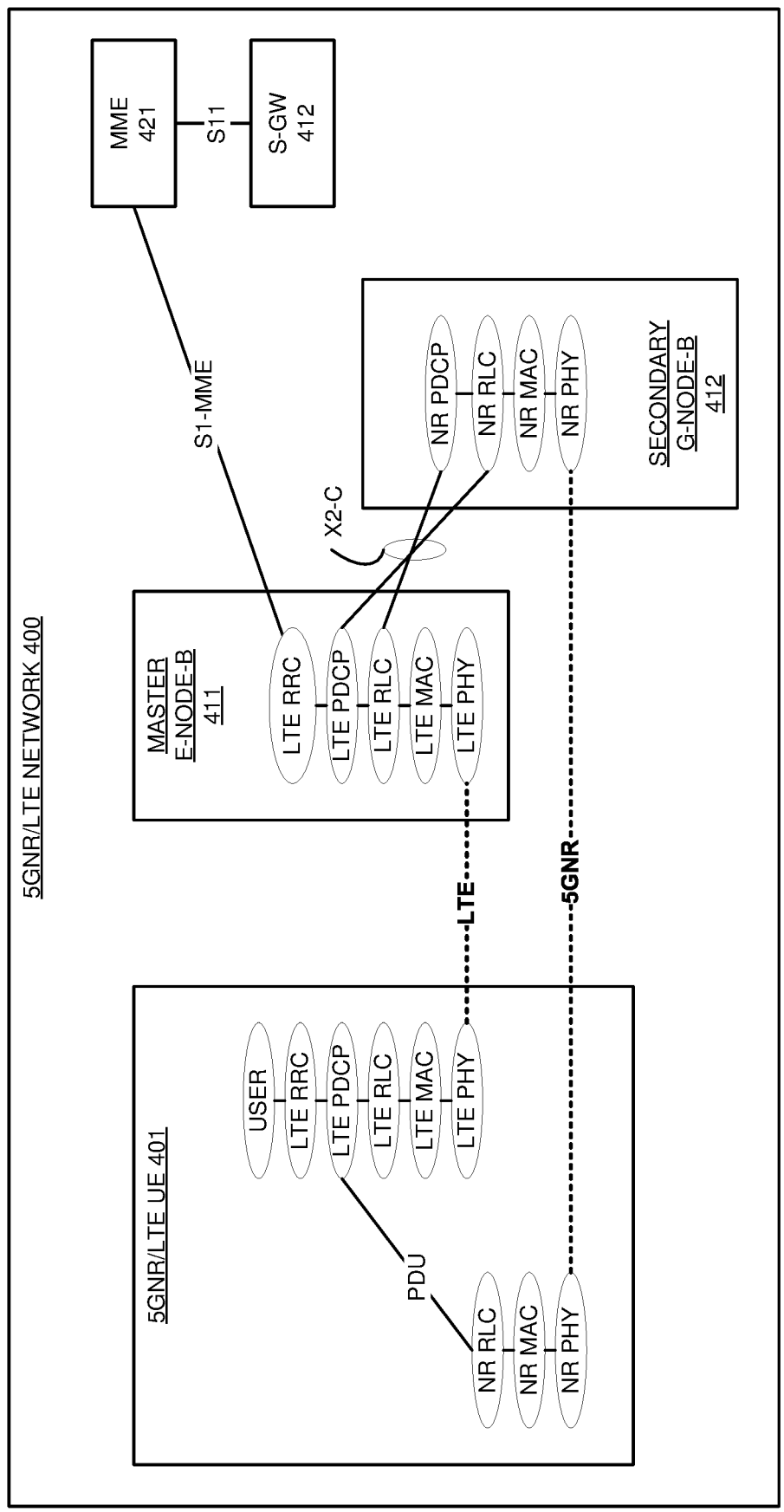
FIG. 7 illustrates a control plane for the 5GNR/LTE network that serves the 5GNR/LTE UE over master LTE eNodeB and the secondary 5GNR gNodeB.

FIG. 7 illustrates a control plane for 5GNR/LTE network 400 that serves 5GNR/LTE UE 401 over master LTE eNodeB 411 and secondary 5GNR gNodeB 412. Initially, the LTE RRC in UE 401 exchanges LTE RRC attachment signaling with the LTE RRC in master eNodeB 411 over the LTE RRC, PDCP, RLC, MAC, and PHY layers. The LTE RRC in master eNodeB 411 and MME 421 exchange LTE S1-MME attachment signaling for UE 401. The LTE RRC in UE 401 exchanges LTE RRC connection signaling with the LTE RRC in master eNodeB 411 over the LTE RRC, PDCP, RLC, MAC, and PHY layers. The LTE RRC in master eNodeB 411 and MME 421 exchange LTE S1-MME connection signaling for UE 401. MME 421 and S-GW 422 exchange LTE S11 connection signaling for UE 401.

The LTE PDCP in master eNodeB 411 determines its uplink resource block utilization. For example, the LTE MAC scheduler may indicate uplink resource block utilization metrics to the LTE PDCP. The LTE PDCP in master eNodeB 411 selects 5GNR/LTE allocations based on the uplink resource block utilization. In some examples, the LTE PDCP in master LTE eNodeB 411 transfers the 5GNR/LTE allocations to the 5GNR PDCP in secondary 5GNR gNodeB 412 over an X2-C link. The LTE PDCP in master eNodeB 411 and the NR RLC or PDCP in secondary gNodeB 412 exchange gNodeB configurations, flow control, UE capabilities, and UE measurements over an X2-C link. In some examples, the NR PDCP in secondary gNodeB 412 and the LTE RLC or PDCP in master eNodeB 411 exchange flow control over an X2-C link.

Figure 8:
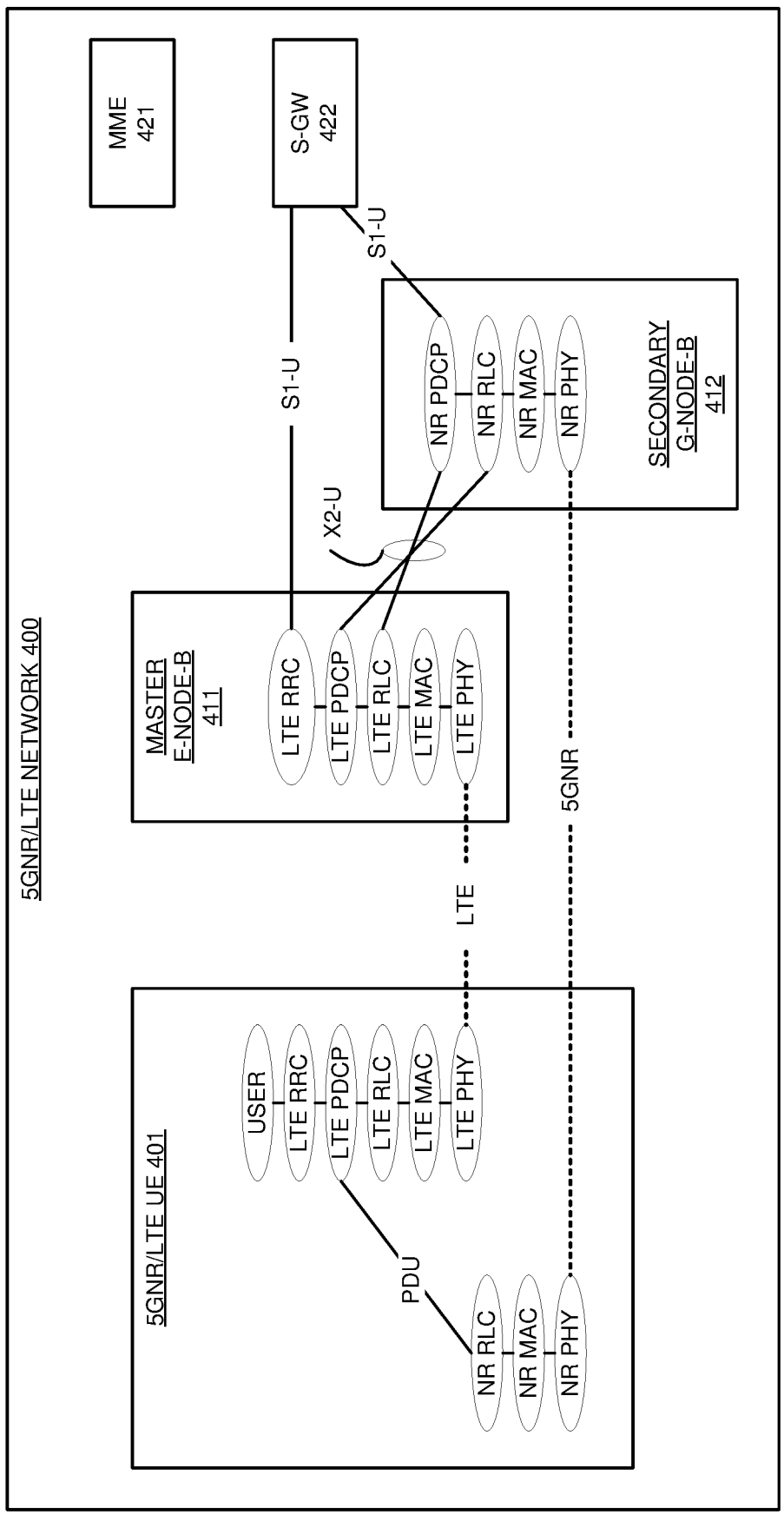
FIG. 8 illustrates a user plane for the 5GNR/LTE network that serves the 5GNR/LTE UE over the master LTE eNodeB and the secondary 5GNR gNodeB.

FIG. 8 illustrates a user plane for 5GNR/LTE network 400 that serves 5GNR/LTE UE 401 over master LTE eNodeB 411 and secondary 5GNR gNodeB 412. In UE 401, the user applications exchange user data with the LTE RRC. On the other side of network 400, S-GW 422 exchanges the user data with the LTE RRC in master eNodeB 411 over the S1-U link. For the UL, the LTE RRC in UE 401 transfers the user data to the LTE RRC in master eNodeB 411 over the LTE PDCP, RLC, MAC, and PHY layers. For the DL, the LTE RRC in in master eNodeB 411 transfers the user data to the LTE PDCP. The LTE PDCP in master eNodeB 411 transfers the LTE allocation of the user data to the LTE PDCP in UE 401 over the LTE RLC, MAC, and PHY layers. The LTE PDCP in master eNodeB 411 transfers the 5GNR allocation of the user data to the NR RLC in secondary gNodeB 412 over an X2-U link. The NR RLC in secondary gNodeB 412 transfers the 5GNR allocation of the user data to the NR RLC in UE 401 over the NR MAC and PHY layers. The NR RLC in UE 401 transfers the 5GNR allocation of the user data to the LTE PDCP over the PDU link. The LTE PDCP in UE 401 converges the LTE and 5GNR allocations of the user data and transfers the converged user data to the LTE RRC. The LTE RRC transfers the user data to the user applications.

In some examples, S-GW 422 transfers additional DL user data to the NR PDCP in secondary gNodeB 412 over an S1-U link. The NR PDCP in secondary gNodeB 412 transfers the 5GNR allocation of this additional DL user data to the LTE PDCP in UE 401 over the NR RLC, MAC, and PHY layers—and the PDU link. The NR PDCP in secondary gNodeB 412 transfers the LTE allocation of the additional DL user data to the LTE RLC in master eNodeB 411 over an X2-U link. The LTE RLC in master eNodeB 411 transfers the LTE allocation of the additional DL user data to the LTE RLC in UE 401 over the LTE MAC and PHY layers. The LTE RLC in UE 401 transfers the LTE allocation of the additional DL user data to the LTE PDCP. The LTE PDCP in UE 401 converges the LTE and 5GNR allocations of the additional DL user data and transfers the converged user data to the LTE RRC. The LTE RRC transfers the user data to the user applications.

Figure 9:
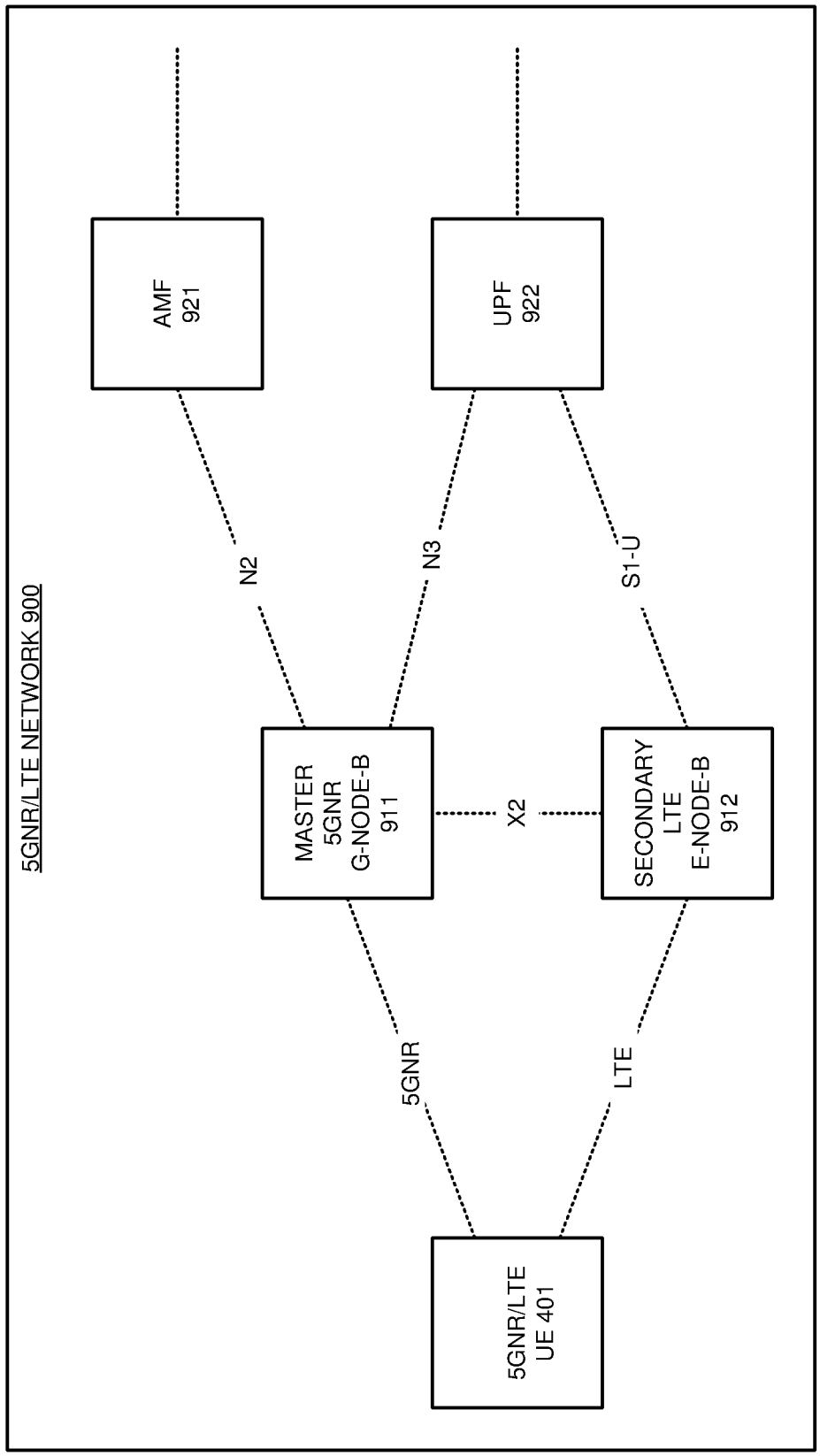
FIG. 9 illustrates a 5GNR/LTE network to serve a 5GNR/LTE UE over a master 5GNR gNodeB and a secondary LTE eNodeB.

FIG. 9 illustrates 5GNR/LTE network 900 to serve 5GNR/LTE UE 401 over master 5GNR gNodeB 911 and secondary LTE eNodeB 912. 5GNR/LTE network 900 is an example of wireless communication network 100, although network 100 may differ. 5GNR/LTE network 900 comprises 5GNR/LTE UE 401, master gNodeB 911, secondary eNodeB 912, Access and Mobility Management Function (AMF) 921, and User Plane Function (UPF) 922. UE 401 is coupled to master gNodeB 911 over a 5GNR link. UE 401 is coupled to secondary eNodeB 412 over an LTE link. Master gNodeB 911 and secondary eNodeB 912 are coupled by X2-U and X2-C links. Master gNodeB 911 and AMF 921 are coupled over N2 links. Master gNodeB 911 and UPF 922 are coupled over N3 links. In some examples, secondary eNodeB 412 and UPF 922 are also coupled over S1-U links. AMF 421 and UPF 422 are coupled to other network elements which are omitted for clarity.

In this example, master 5GNR gNodeB 911 determines its average uplink and downlink 5GNR resource block utilization. Master 5GNR gNodeB 911 selects 5GNR/LTE allocations based on these average resource block utilizations. Master 5GNR gNodeB 911 receives user data for UE 401 from UPF 922 over an N3 link. Master 5GNR gNodeB 911 transfers a portion of the user data to secondary LTE eNodeB 912 over an X2-U link per the 5GNR/LTE allocations. Master 5GNR gNodeB 911 transfers the rest of the user data to UE 401 over the 5GNR link per the 5GNR/LTE allocations. Secondary LTE eNodeB 912 receives the portion of the user data from master 5GNR gNodeB 412. Secondary LTE eNodeB 412 transfers the portion of the user data to UE 401 over an LTE link.

Master 5GNR gNodeB 411 may transfer the 5GNR/LTE allocations to secondary LTE eNodeB 412 over an X2-C link. Secondary LTE eNodeB 412 then receives additional user data for UE 401 from UPF 922 over an S1-U link. Secondary LTE eNodeB 412 transfers a portion of the additional user data to master 5GNR gNodeB 911 over an X2-U link per the 5GNR/LTE allocations. Secondary LTE eNodeB 412 transfers the remainder of the additional user data to UE 401 over the LTE link per the 5GNR/LTE allocations. Master 5GNR gNodeB 411 receives the portion of the additional user data from secondary LTE eNodeB 412 over the X2-U link. Master 5GNR gNodeB 412 transfers the portion of the additional user data to UE 401 per the 5GNR/LTE allocations.

Figure 10:
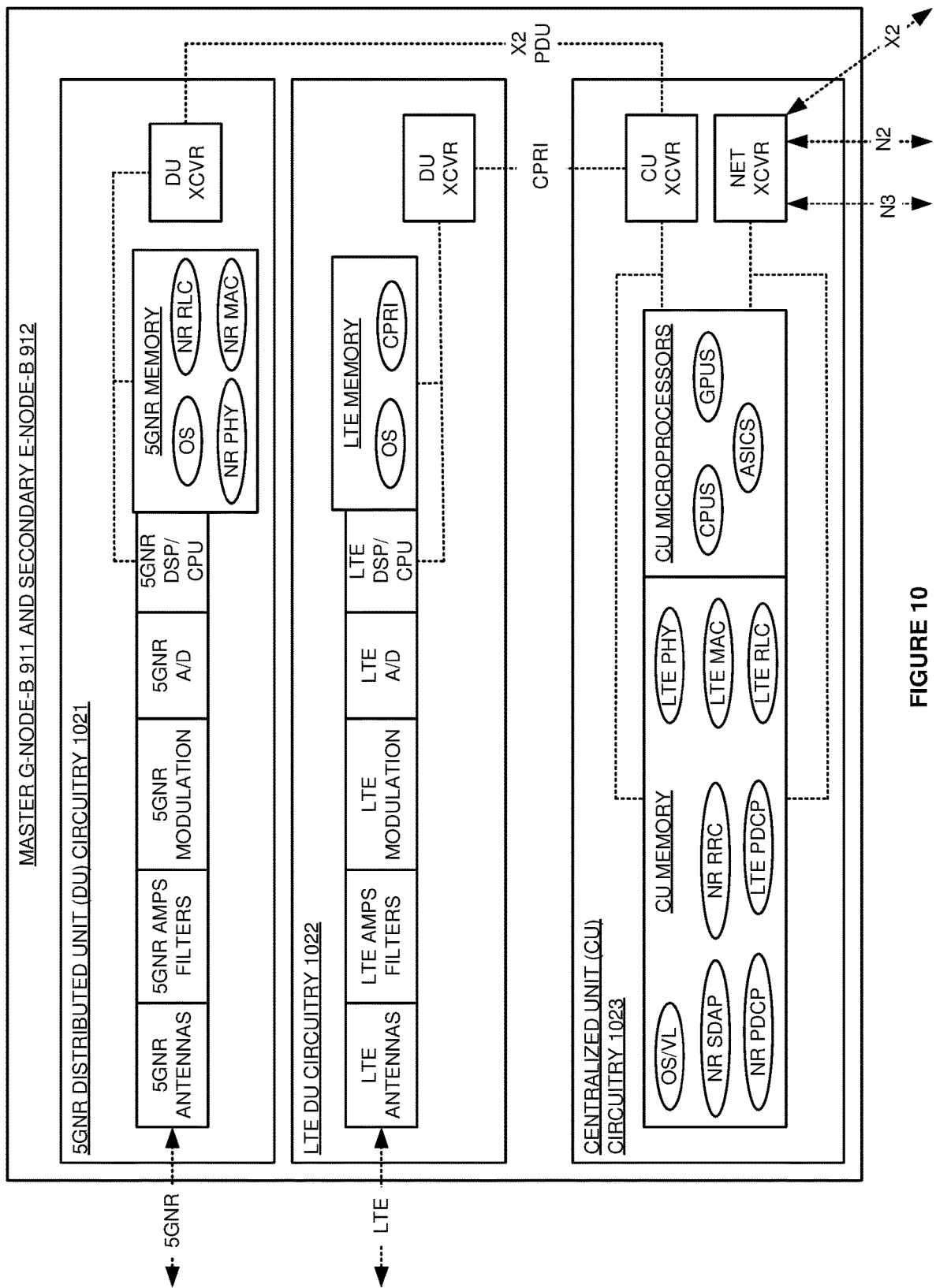
FIG. 10 illustrates the master 5GNR gNodeB and the secondary LTE eNodeB that serve the 5GNR/LTE UE.

FIG. 10 illustrates master 5GNR gNodeB 911 and secondary LTE eNodeB 912 that serve 5GNR/LTE UE 401. Node-Bs 911-912 comprise an example of access nodes 111-112, although nodes 111-112 may differ. Master 5GNR gNodeB 911 comprises 5GNR Distributed Unit (DU) circuitry 1021 and portions of Centralized Unit (CU) circuitry 1023. Secondary LTE eNodeB 912 comprises LTE DU circuitry 1022 and portions of CU circuitry 1023. DU circuitry 1021-1022 each comprise antennas, amplifiers/filters, modulation, A/D, DSP/CPU, memory, and DU transceivers that are coupled over bus circuitry. CU circuitry 1023 comprises CU microprocessors, CU memory, CU transceivers, and network transceivers that are coupled over bus circuitry.

The antennas in 5GNR DU circuitry 1021 are coupled to 5GNR/LTE UE 401 over a wireless 5GNR link. The antennas in LTE DU circuitry 1022 are coupled to 5GNR/LTE UE 401 over a wireless LTE link. The DU transceivers in 5GNR DU circuitry 1021 are coupled to the CU transceivers in CU circuitry 1023 over X2 and PDU links. The DU transceivers in LTE DU circuitry 1022 are coupled to the CU transceivers in CU circuitry 1023 over LTE CPRI links. The network transceivers in CU circuitry 1023 are coupled to AMF 921 over N2 links. The network transceivers in CU circuitry 1023 are coupled to UPF 922 over N3 links. The network transceivers in CU circuitry 1023 are coupled to other wireless access nodes over X2 links.

In 5GNR DU circuitry 1021, the 5GNR memory stores an operating system and network applications for 5GNR PHY, MAC, and RLC. In LTE DU circuitry 1022, the LTE memory stores an operating system and network applications for CPRI. In CU circuitry 1023, the CU memory stores an operating system, virtual layer (VL) components, and network applications. The virtual layer components comprise hypervisor modules, virtual switches, virtual machines, and/or the like. The network applications include LTE PHY, LTE MAC, LTE RLC, LTE PDCP, NR RRC, NR SDAP, and NR PDCP. In this example, 5GNR DU circuitry 1021 hosts the network applications for NR PHY, MAC, and RLC while CU circuitry 1023 hosts the network applications for NR PDCP, NR RRC, NR SDAP, LTE RLC, LTE MAC, and LTE PHY. In other examples, circuitry 1021-1023 may use other network application splits.

In 5GNR DU circuitry 1021, the antennas receive wireless UL 5GNR signals from 5GNR/LTE UE 401 that transport user data and network signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSPs recover UL 5GNR symbols from the UL digital signals. In 5GNR DU circuitry 1021, the 5GNR CPU executes the 5GNR PHY, MAC, and RLC to recover 5GNR PDUs from the UL 5GNR symbols. The DU transceivers transfer the UL 5GNR PDUs to the CU transceivers in CU circuitry 1023 over the PDU links.

In CU circuitry 1023, the CU microprocessors execute the 5GNR PDCP, RRC, and SDAP to recover UL SDAP data and RRC signaling from the UL 5GNR PDUs. The CU microprocessors execute the 5GNR RRC to process UL RRC and DL S1-MME signaling to generate DL RRC signaling and UL S1-MME signaling. The CU microprocessors execute the 5GNR SDAP to process UL 5GNR data and generate UL N3 data. The network transceivers transfer the UL N3 data to UPF 922 over the N3 links. The network transceivers transfer the N2 signaling to AMF 921 over the N2 links.

The network transceivers receive DL N2 signaling from AMF 921 over the N2 links. The network transceivers receive DL N3 data from AMF 922 over the N3 links. The CU microprocessors execute the 5GNR RRC to process the DL N2 signaling and UL RRC signaling to generate DL RRC signaling and UL N2 signaling. The CU microprocessors execute the 5GNR SDAP and PDCP to process the DL N3 data to generate DL 5GNR PDUs and DL LTE PDUs per the 5GNR/LTE allocations. The CU microprocessors execute the LTE RLC, MAC, and PHY to process the DL LTE PDUs to generate DL LTE symbols. The CU transceivers transfer the DL 5GNR PDUs to 5GNR DU circuitry 1021 over the PDU links. The CU transceivers transfer the DL LTE symbols to LTE DU circuitry 1022 over the CPRI links.

In 5GNR DU circuitry 1021, the 5GNR CPU executes the 5GNR RLC, MAC, and PHY to process the DL PDUs to generate DL 5GNR symbols. The 5GNR DSP process the DL 5GNR symbols to generate corresponding digital DL signals for the 5GNR A/D. In LTE DU circuitry 1022, the LTE DSP processes the DL LTE symbols and generate corresponding digital DL signals for the LTE A/D. In DU circuitry 1021-1022, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless 5GNR and LTE signals that transport the DL data and signaling to 5GNR/LTE UE 401.

In CU circuitry 1023, the 5GNR SDAP maps between the user data and Service Data Units (SDUs). The 5GNR RRC maps between network signaling and SDUs. The 5GNR SDAP and the LTE/5GNR RRCs exchange their SDUs with the LTE/5GNR PDCPs. The PDCPs map between the SDUs and Protocol Data Units (PDUs). The 5GNR/LTE PDCPs exchange the PDUs with the LTE RLC in circuitry 1023 and with the 5GNR RLC in DU circuitry 1021. The RLCs map between the PDUs and MAC logical channels. The RLCs exchange the user data and network signaling with the MACs over the MAC logical channels. The MACs map between the MAC logical channels and MAC transport channels. The MAC exchanges the user data and network signaling with the PHYs over the MAC transport channels. The PHYs map between the MAC transport channels and PHY transport channels. The PHYs exchange the user data and network signaling with PHYs in 5GNR/LTE UE 401 over the PHY transport channels.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

Figure 11:
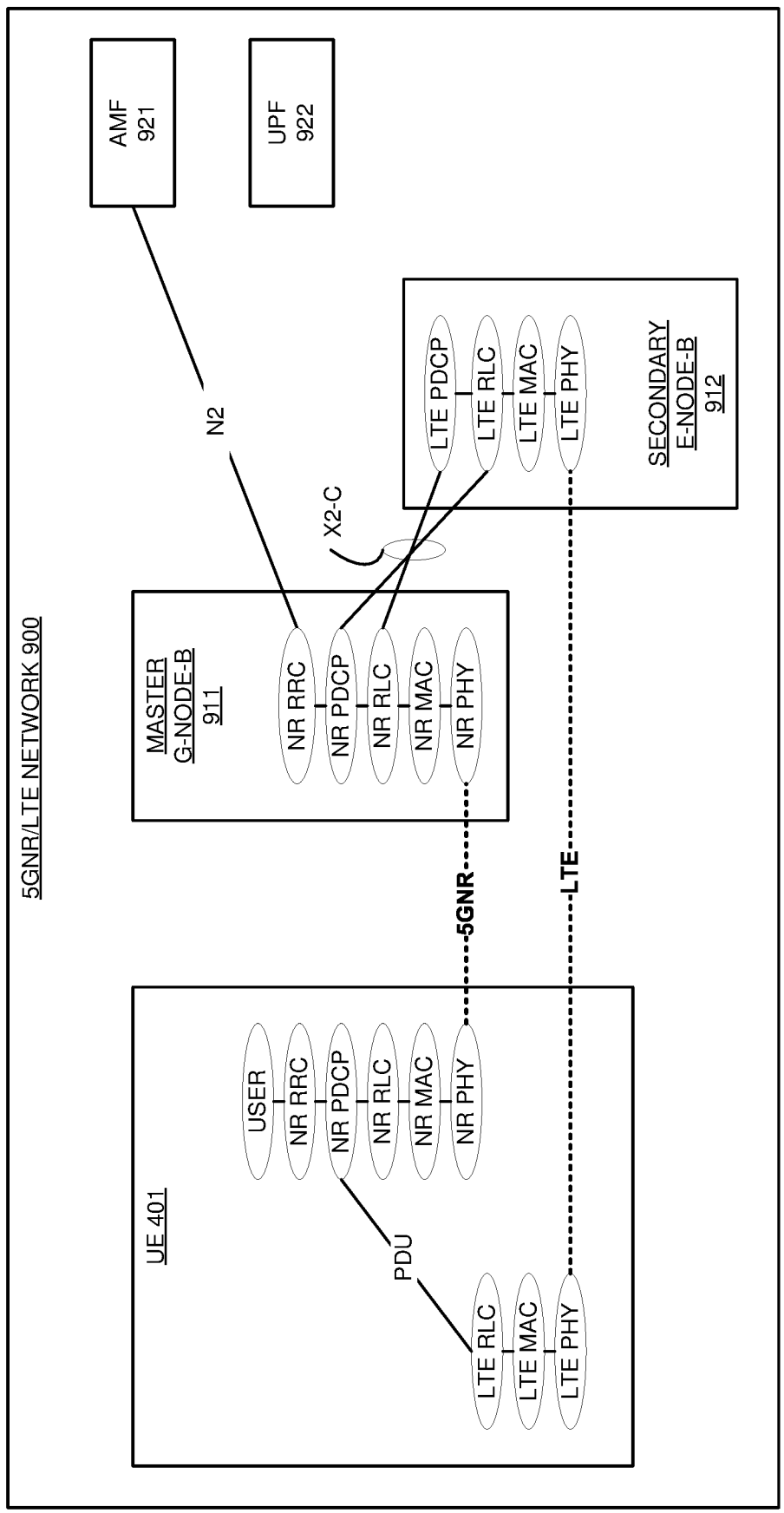
FIG. 11 illustrates a control plane for the 5GNR/LTE network that serves the 5GNR/LTE UE over the master 5GNR gNodeB and the secondary LTE eNodeB.

FIG. 11 illustrates a control plane for 5GNR/LTE network 900 that serves 5GNR/LTE UE 401 over master 5GNR gNodeB 911 and secondary LTE eNodeB 912. Initially, the 5GNR RRC in UE 401 exchanges 5GNR RRC attachment signaling with the 5GNR RRC in master 5GNR gNodeB 911 over the 5GNR PDCP, RLC, MAC, and PHY layers. The 5GNR RRC in master 5GNR gNodeB 911 and AMF 921 exchange 5GNR N2 attachment signaling for UE 401. The 5GNR RRC in UE 401 exchanges 5GNR RRC connection signaling with the 5GNR RRC in master 5GNR gNodeB 911 over the 5GNR PDCP, RLC, MAC, and PHY layers. The 5GNR RRC in master 5GNR gNodeB 911 and AMF 921 exchange 5GNR N2 connection signaling for UE 401.

The 5GNR PDCP in master 5GNR gNodeB 911 determines its uplink resource block utilization. For example, the 5GNR MAC scheduler may indicate uplink resource block utilization metrics to the 5GNR PDCP. The 5GNR PDCP in master 5GNR gNodeB 911 selects 5GNR/LTE allocations based on the uplink resource block utilization. In some examples, the 5GNR PDCP in master 5GNR eNodeB 911 transfers the 5GNR/LTE allocations to the LTE PDCP in secondary LTE eNodeB 912 over an X2-C link. The 5GNR PDCP in master 5GNR gNodeB 911 and the LTE RLC or PDCP in secondary LTE eNodeB 912 exchange eNodeB configurations, flow control, UE capabilities, and UE measurements over an X2-C link. In some examples, the LTE PDCP in secondary eNodeB 412 and the 5GNR RLC or PDCP in master gNodeB 911 exchange flow control over an X2-C link.

Figure 12:
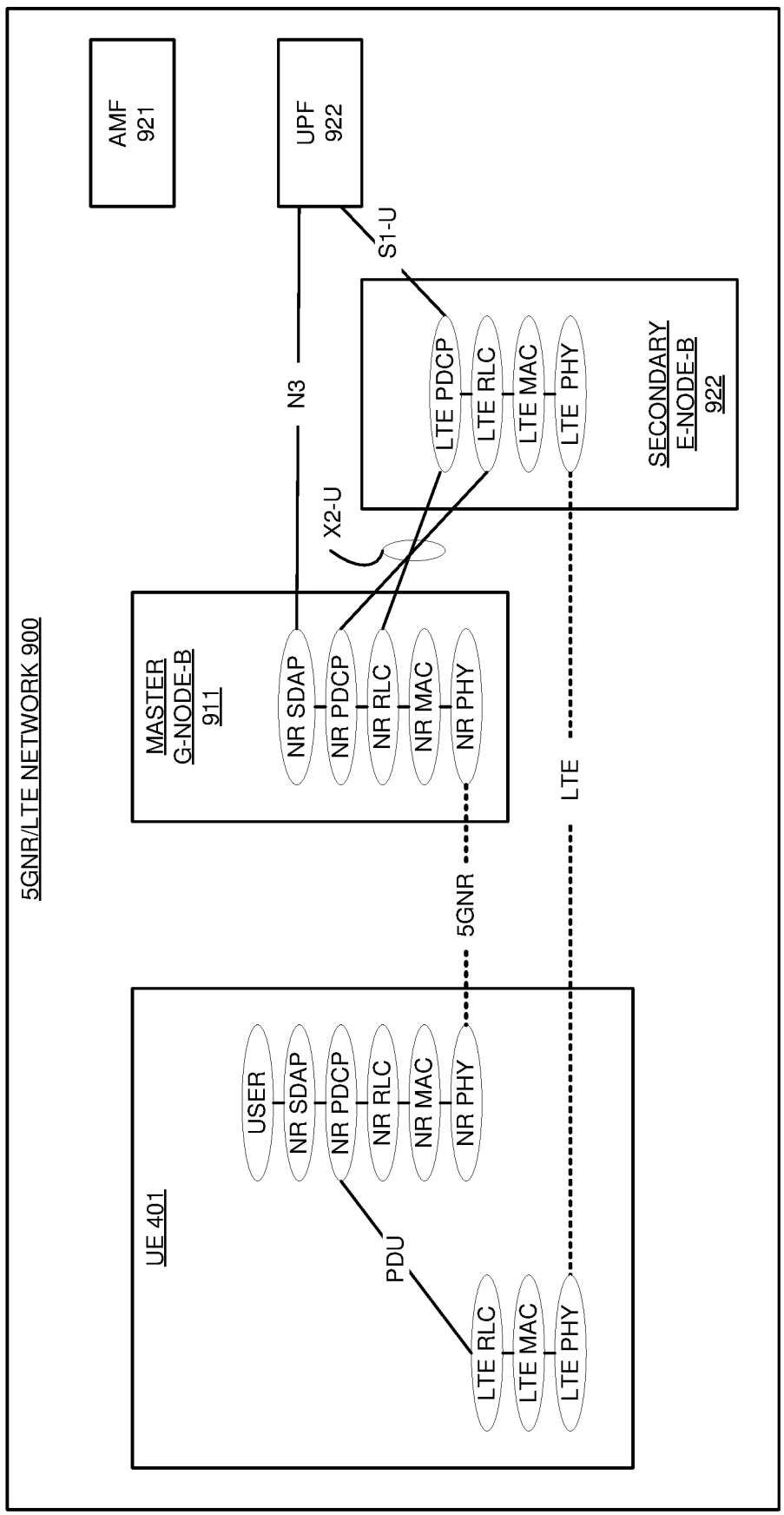
FIG. 12 illustrates a user plane for the 5GNR/LTE network that serves the UE over the master 5GNR gNodeB and the secondary LTE eNodeB.

FIG. 12 illustrates a user plane for 5GNR/LTE network 900 that serves 5GNR/LTE UE 401 over master 5GNR gNodeB 911 and secondary LTE eNodeB 912. In UE 401, the user applications exchange user data with the 5GNR SDAP. On the other side of network 900, UPF 922 exchanges the user data with the 5GNR SDAP in master 5GNR gNodeB 911 over the N3 links. For the UL, the 5GNR SDAP in UE 401 transfers the user data to the 5GNR SDAP in master 5GNR gNodeB 411 over the 5GNR PDCP, RLC, MAC, and PHY layers. For the DL, the 5GNR SDAP in master gNodeB 911 transfers the user data to the 5GNR PDCP. The 5GNR PDCP in master gNodeB 911 transfers the 5GNR allocation of the user data to the 5GNR PDCP in UE 401 over the 5GNR RLC, MAC, and PHY layers. The 5GNR PDCP in master 5GNR gNodeB 911 transfers the LTE allocation of the user data to the LTE RLC in secondary LTE eNodeB 912 over an X2-U link. The LTE RLC in secondary LTE eNodeB 912 transfers the LTE allocation of the user data to the LTE RLC in UE 401 over the LTE MAC and PHY layers. The LTE RLC in UE 401 transfers the LTE allocation of the user data to the 5GNR PDCP over the PDU link. The 5GNR PDCP in UE 401 converges the LTE and 5GNR allocations of the user data and transfers the converged user data to the 5GNR SDAP. The 5GNR SDAP transfers the user data to the user applications.

In some examples, UPF 922 transfers additional DL user data to the LTE PDCP in secondary LTE eNodeB 912 over an S1-U link. The LTE PDCP in secondary eNodeB 912 transfers the LTE allocation of this additional DL user data to the 5GNR PDCP in UE 401 over the LTE RLC, MAC, and PHY layers—and the PDU link. The LTE PDCP in secondary eNodeB 912 transfers the 5GNR allocation of the additional DL user data to the 5GNR RLC in master gNodeB 911 over an X2-U link. The 5GNR RLC in master 5GNR gNodeB 911 transfers the 5GNR allocation of the additional DL user data to the 5GNR RLC in UE 401 over the 5GNR MAC and PHY layers. The 5GNR RLC in UE 401 transfers the 5GNR allocation of the additional DL user data to the 5GNR PDCP. The 5GNR PDCP in UE 401 converges the LTE and 5GNR allocations of the additional DL user data and transfers the converged user data to the 5GNR SDAP. The 5GNR SDAP transfers the user data to the user applications.

Figure 13:
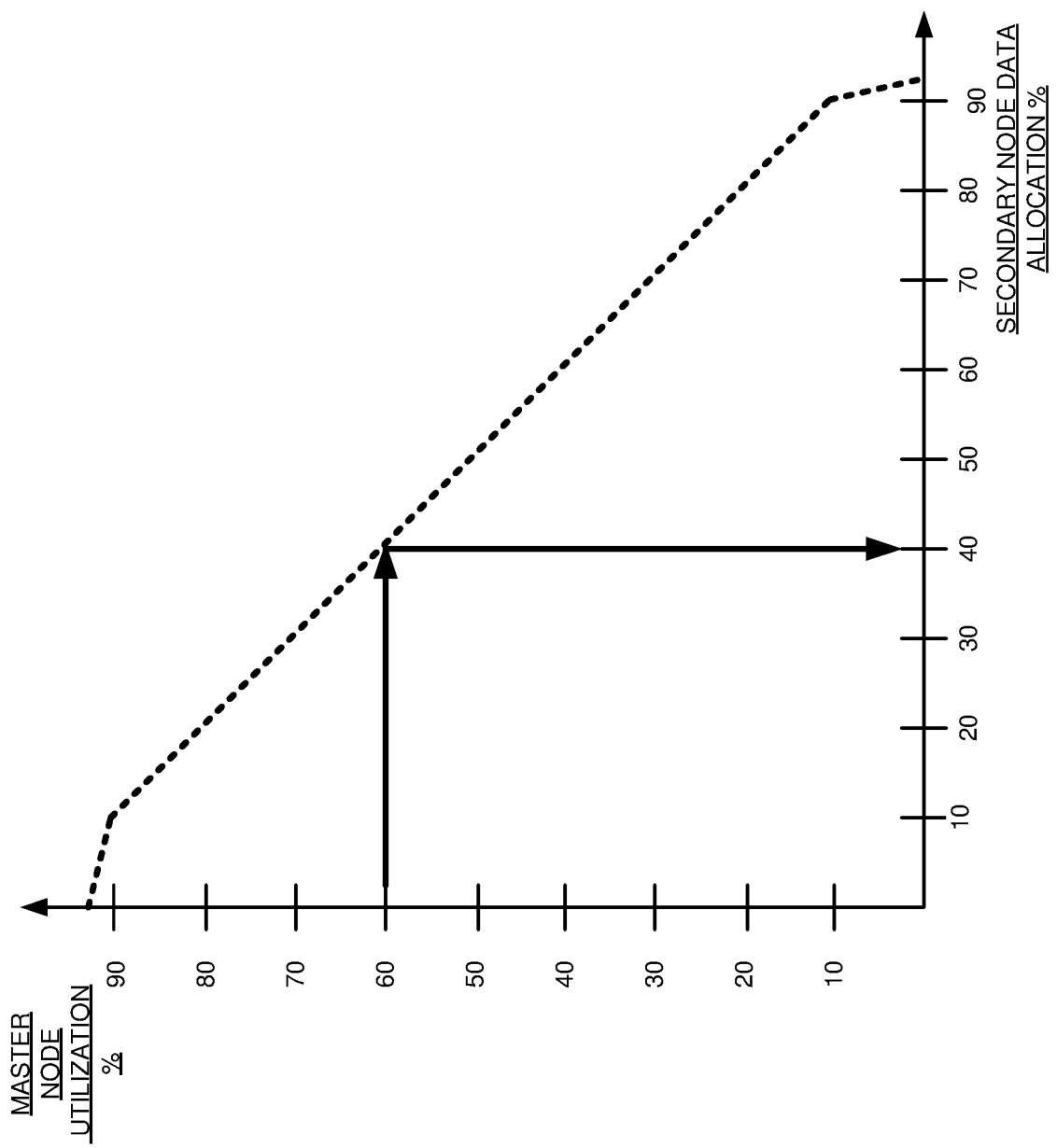
FIG. 13 illustrates 5GNR/LTE data allocations.

FIG. 13 illustrates 5GNR/LTE data allocations. The 5GNR/LTE data allocations are depicted on a graph having a vertical axis the utilization percent of the master access node. The graph has a horizontal axis for secondary node data allocation percentage. The master access node hosts a data structure that corresponds to the dotted line on the graph. For example, entering the data structure with a master node utilization of 60% yields a secondary node data allocation of 40%. Thus, the master node transfers 60% of the DL user data to the UE and the secondary node transfers 40% of the DL user data to the UE. Norte that the master node uses the secondary node less as the master node gets busy, and the master node uses the secondary node more as master node gets less busy.

The wireless data network circuitry described above comprises computer hardware and software that form special-purpose access node circuitry to serve user communication devices over dual LTE and 5GNR links. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose access node circuitry to serve user communication devices over dual LTE and 5GNR links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UE) over a Fifth Generation New Radio (5GNR) access node and a Long Term Evolution (LTE) access node, the method comprising:
   the LTE access node determining a utilization metric indicating an amount of consumed communication resources for the LTE access node;
   the LTE access node selecting 5GNR/LTE user data allocations based on the utilization metric for the LTE access node;
   the LTE access node receiving user data for the UE from a wireless network core;
   the LTE access node transferring a portion of the user data to the 5GNR access node per the 5GNR/LTE user data allocations and transferring the remainder of the user data to the UE over an LTE link per the 5GNR/LTE user data allocations; and
   the 5GNR access node receiving the portion of the user data and transferring the portion of the user data to the UE over a 5GNR link.

2. The method of claim 1 wherein the LTE access node transferring the portion of the user data to the 5GNR access node comprises transferring the portion of the user data over an X2 link.

3. The method of claim 1 wherein the LTE access node transferring the portion of the user data to the 5GNR access node per the 5GNR/LTE user data allocations comprises transferring the portion of the user data from an LTE Protocol Data Convergence Protocol (PDCP) layer to a 5GNR Radio Link Control (RLC) layer.

4. The method of claim 1 wherein:
   the LTE access node comprises an LTE Distributed Unit (DU);
   the 5GNR access node comprises a 5GNR DU; and
   the LTE access node and the 5GNR comprise a shared Centralized Unit (CU).

5. The method of claim 1 wherein the LTE access node selecting the 5GNR/LTE user data allocations comprises:
   the LTE access node increasing a 5GNR portion of the 5GNR/LTE user data allocations in response to the utilization metric for the LTE access node decreasing; and
   the LTE access node decreasing the 5GNR portion of the 5GNR/LTE user data allocations in response to the utilization metric for the LTE access node increasing.

6. The method of claim 1 wherein the utilization of the LTE access node comprises resource block utilization.

7. The method of claim 1 wherein the LTE access node selecting the 5GNR/LTE user data allocations comprises periodically selecting the 5GNR/LTE user data allocations.

8. A method of operating a wireless communication network to serve User Equipment (UE) over a Fifth Generation New Radio (5GNR) access node and a Long Term Evolution (LTE) access node, the method comprising:
   the LTE access node determining a utilization metric indicating an amount of consumed communication resources for the LTE access node;
   the LTE access node selecting 5GNR/LTE user data allocations based on the utilization metric for the LTE access node and transferring the 5GNR/LTE user data allocations to the 5GNR access node;
   the 5GNR access node receiving user data for the UE from a wireless network core;
   the 5GNR access node transferring a portion of the user data to the LTE access node per the 5GNR/LTE user data allocations;

the LTE access node receiving the portion of the user data and transferring the portion of the user data to the UE over an LTE link per the 5GNR/LTE user data allocations; and the 5GNR access node transferring the remainder of the user data to the UE over a 5GNR link per the 5GNR/LTE user data allocations.

9. The method of claim 8 wherein the 5GNR access node transferring the portion of the user data to the LTE access node comprises transferring the portion of the user data over an X2 link.

10. The method of claim 8 wherein the 5GNR access node transferring the portion of the user data to the LTE access node comprises transferring the portion of the user data from a 5GNR Protocol Data Convergence Protocol (PDCP) layer to an LTE Radio Link Control (RLC) layer.

11. A wireless communication network to serve User Equipment (UE) over a Fifth Generation New Radio (5GNR) access node and a Long Term Evolution (LTE) access node, the wireless communication network comprising:

the LTE access node configured to determine a utilization metric indicating an amount of consumed communication resources for the LTE access node and select 5GNR/LTE user data allocations based on the utilization metric for the LTE access node;

the LTE access node configured to receive user data for the UE from a wireless network core, transfer a portion of the user data to the 5GNR access node per the 5GNR/LTE user data allocations, and transfer the remainder of the user data to the UE over an LTE link per the 5GNR/LTE user data allocations; and the 5GNR access node configured to receive the portion of the user data and transfer the portion of the user data to the UE over a 5GNR link per the 5GNR/LTE user data allocations.

12. The wireless communication network of claim 11 wherein the LTE access node is configured to transfer the portion of the user data to the 5GNR access node over an X2 link.

13. The wireless communication network of claim 11 wherein the LTE access node is configured to transfer the portion of the user data from a from an LTE Protocol Data Convergence Protocol (PDCP) layer to a 5GNR Radio Link Control (RLC) layer in the 5GNR access node.

14. The wireless communication network of claim 11 wherein:

the LTE access node comprises an LTE Distributed Unit (DU);

the 5GNR access node comprises a 5GNR DU; and the LTE access node and the 5GNR comprise a shared Centralized Unit (CU).

15. The wireless communication network of claim 11 wherein:

the LTE access node is configured to increase a 5GNR portion of the 5GNR/LTE user data allocations in response to the utilization metric for the LTE access node decreasing; and the LTE access node is configured to decrease the 5GNR portion of the 5GNR/LTE user data allocations in response to the utilization metric for the LTE access increasing.

16. The wireless communication network of claim 11 wherein the utilization of the LTE access node comprises resource block utilization.

17. The wireless communication network of claim 11 wherein the LTE access node is configured to periodically select the 5GNR/LTE user data allocations.

18. The wireless communication network of claim 11 further comprising:

the LTE access node configured to transfer the 5GNR/LTE user data allocations to the 5GNR access node;

the 5GNR access node configured to receive additional user data for the UE and transfer a portion of the additional user data to the LTE access node per the 5GNR/LTE user data allocations;

the LTE access node configured to receive the portion of the additional user data and transfer the portion of the additional user data to the UE over the LTE link per the 5GNR/LTE user data allocations; and the 5GNR access node configured to transfer the remainder of the additional user data to the UE over the 5GNR link per the 5GNR/LTE user data allocations.

19. The wireless communication network of claim 18 wherein the 5GNR access node is configured to transfer the portion of the additional user data to the LTE access node over the X2 link.

20. The wireless communication network of claim 18 wherein the 5GNR access node is configured to transfer the portion of the additional user data from a 5GNR Protocol Data Convergence Protocol (PDCP) layer to an LTE Radio Link Control (RLC) layer in the LTE access node.

* * * * *